(12) United States Patent
Panasik et al.

(10) Patent No.: US 7,546,938 B2
(45) Date of Patent: Jun. 16, 2009

(54) FUEL CELL COMPARTMENT FOR COMBUSTION-POWERED TOOL

(75) Inventors: Cheryl L. Panasik, Elburn, IL (US); Kevin M. Tucker, Chicago, IL (US); James W. Robinson, Mundelein, IL (US); Norbert K. Kolodziej, Park Ridge, IL (US); Yongping Gong, Glenview, IL (US)

(73) Assignee: Illinois Tool Works Inc., Glenview, IL (US)

( * ) Notice: Subject to any disclaimer, the term of this patent is extended or adjusted under 35 U.S.C. 154(b) by 704 days.

(21) Appl. No.: 10/959,845

(22) Filed: Oct. 6, 2004

(65) Prior Publication Data
US 2006/0042571 A1 Mar. 2, 2006

Related U.S. Application Data

(60) Provisional application No. 60/606,309, filed on Sep. 1, 2004.

(51) Int. Cl.
*B25C 1/08* (2006.01)
*B25C 1/12* (2006.01)
*B25C 1/14* (2006.01)
*B25C 1/04* (2006.01)
*B25C 5/02* (2006.01)
*F02B 71/00* (2006.01)

(52) U.S. Cl. ............... 227/10; 227/9; 227/130; 227/156; 123/46 H; 123/46 SC

(58) Field of Classification Search ............... 123/495; 429/34; 227/9, 10, 130, 156
See application file for complete search history.

(56) References Cited

U.S. PATENT DOCUMENTS

| | | | |
|---|---|---|---|
| 4,403,722 A * | 9/1983 | Nikolich | 227/8 |
| 5,263,439 A | 11/1993 | Doherty et al. | |
| 5,558,264 A | 9/1996 | Weinstein | |
| 5,680,980 A * | 10/1997 | Robinson | 227/10 |
| 6,223,966 B1 * | 5/2001 | Nayrac et al. | 227/130 |
| 6,302,297 B1 | 10/2001 | Richardson et al. | |
| 6,722,548 B2 * | 4/2004 | Odoni et al. | 227/8 |
| 6,722,549 B2 | 4/2004 | Shkolnikov et al. | |
| 6,786,378 B2 * | 9/2004 | Wagdy et al. | 227/9 |
| 2003/0034377 A1 | 2/2003 | Porth et al. | |

* cited by examiner

*Primary Examiner*—Patrick Ryan
*Assistant Examiner*—Muhammad Siddiquee
(74) *Attorney, Agent, or Firm*—Greer, Burns & Crain, Ltd.; Mark W. Croll; Cristopher P. Rauch

(57) ABSTRACT

A housing for a power tool having a power source, includes a fuel cell chamber configured for attachment to the power source and dimensioned for operationally receiving a fuel cell in either one of a first orientation and a second orientation.

12 Claims, 2 Drawing Sheets

FUEL CELL COMPARTMENT FOR COMBUSTION-POWERED TOOL

This application claims priority under 35 U.S.C 119(e) from U.S. Provisional Application Ser. No. 60/606,309 filed Sep. 1, 2004.

BACKGROUND

The present invention relates generally to handheld power tools, and specifically to combustion-powered fastener-driving tools, also referred to as combustion tools.

Combustion-powered tools are known in the art, and one type of such tools, also known as IMPULSE® brand tools for use in driving fasteners into workpieces, is described in commonly assigned patents to Nikolich U.S. Pat. Re. No. 32,452, and U.S. Pat. Nos. 4,522,162; 4,483,473; 4,483,474; 4,403,722; 5,197,646; 5,263,439 and 6,145,724, all of which are incorporated by reference herein. Similar combustion-powered nail and staple driving tools are available commercially from ITW-Paslode of Vernon Hills, Ill. under the IMPULSE®, ▯BUILDEX® and PASLODE® brands.

Such tools incorporate a generally pistol-shaped tool housing enclosing a small internal combustion engine. The engine is powered by a canister of pressurized fuel gas, also called a fuel cell. A battery-powered electronic power distribution unit produces a spark for ignition, and a fan located in a combustion chamber provides for both an efficient combustion within the chamber, while facilitating processes ancillary to the combustion operation of the device. The engine includes a reciprocating piston with an elongated, rigid driver blade disposed within a single cylinder body.

Upon the pulling of a trigger switch, which causes the spark to ignite a charge of gas in the combustion chamber of the engine, the combined piston and driver blade is forced downward to impact a positioned fastener and drive it into the workpiece. The piston then returns to its original, or pre-firing position, through differential gas pressures within the cylinder. Fasteners are fed magazine-style into the nosepiece, where they are held in a properly positioned orientation for receiving the impact of the driver blade.

Conventional combustion fastener driving tools employ two types of fuel delivery systems, mechanical fuel injection and electronic fuel injection. With mechanical fuel injection, the fuel cell is provided with a metering valve, either affixed to the fuel cell or to the tool. The fuel cell is inserted into a fuel cell chamber of the fuel cell with the bottom of the fuel cell facing generally towards the workpiece when the tool is oriented operationally. Once a fuel cell door is closed, formations on the door and/or internal linkages cause the fuel metering valve to dispense a measured quantity of fuel to the tool's combustion chamber.

When electronic fuel injection is employed, the delivery of fuel is controlled by a central processing unit (CPU) typically incorporating a microprocessor. In such configurations, the fuel cell is inserted into the fuel cell chamber in the opposite orientation relative to the mechanical fuel injection configuration. As such, the fuel cell is inserted with the dispensing end toward the tool's nosepiece. Once inserted, the fuel cell stem is sealingly engaged or coupled to a fuel injector controlled by the CPU.

Manufacturers have been forced to provide separate tool housings for each of the above-identified fuel delivery configurations. Such separate configurations entail separate fuel cell access doors, among other things.

In addition, in instances when electronic fuel injection is selected, a fuel line is used to transmit the fuel from the injector to the combustion chamber. Due to the cramped environment of the tool housing, it has been found that conventional fuel fittings for sealingly transmitting the fuel take up needed space, and often impair fuel flow.

Thus, there is a need for a combustion-powered fastener-driving tool which addresses the problem of multiple housings for various fuel delivery options. There is also a need for such a tool with a fuel line configured for providing sealed connections without unnecessarily impeding fuel flow.

BRIEF SUMMARY

The above-listed needs are met or exceeded by the present housing for a power tool, particularly for a combustion-powered fastener-driving tool. A housing includes a fuel cell chamber configured for receiving a fuel cell in either one of two axial orientations, depending on the specific fuel delivery system employed. In addition, a universal fuel cell door is provided with a shape which engages the fuel cell in either one of the first and second operational orientations.

More specifically, a housing for a power tool having a power source includes a fuel cell chamber configured for attachment to the power source and dimensioned for operationally receiving a fuel cell in either one of a first orientation and a second orientation. In a preferred embodiment, a shelf mount is disposed in the chamber and configured for engaging a fuel injector when the fuel cell is in the first orientation, and for supporting a bottom of the fuel cell when the fuel cell is in the second orientation.

In a second embodiment, a combustion-powered fastener driving tool includes a power source located within a power source housing, a handle housing including a fuel cell chamber configured for attachment to the power source and dimensioned for receiving a fuel cell in either one of a first operational orientation and a second operational orientation. A primary handle has a first end connected to the fuel cell chamber and a second end connected to a battery housing, a secondary handle is connected at one end to the battery housing and at a second end to a support strut, the support strut is connected to the fuel cell chamber housing.

In a third embodiment, a universal fuel door for use in a combustion-powered tool having a power source and a housing defining a fuel cell chamber with an open end for receiving a fuel cell includes a door body configured for pivotably engaging the open end of the fuel cell, at least one first formation for engaging the fuel cell upon insertion into the fuel cell chamber in a first operational orientation and at least one second formation for engaging the fuel cell upon insertion into the fuel cell chamber in a second operational orientation.

DETAILED DESCRIPTION

Figure 1:
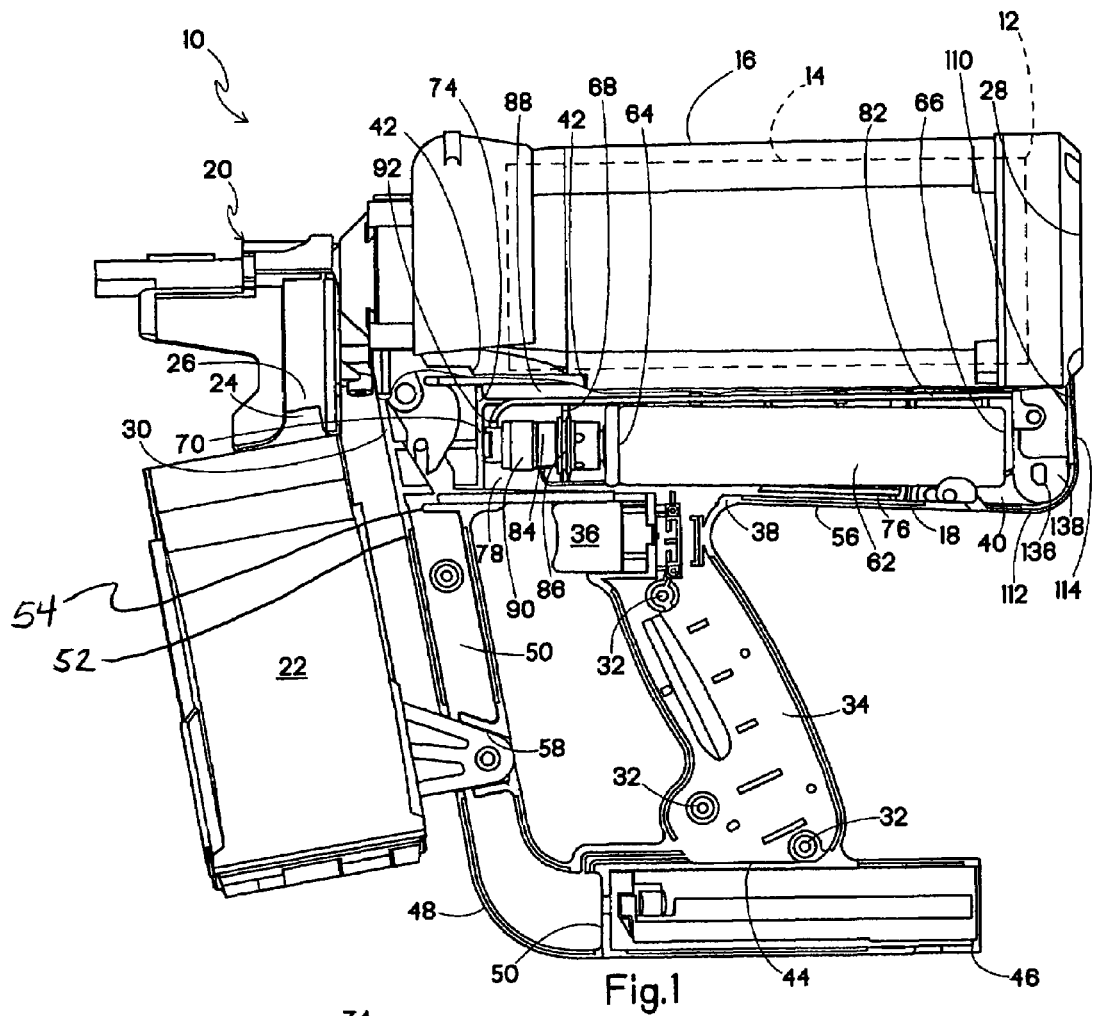
FIG. 1 is a side elevation of a combustion-powered fastener-driving tool with portions shown omitted for clarity and depicting the fuel cell in a first operational orientation.
Figure 2:
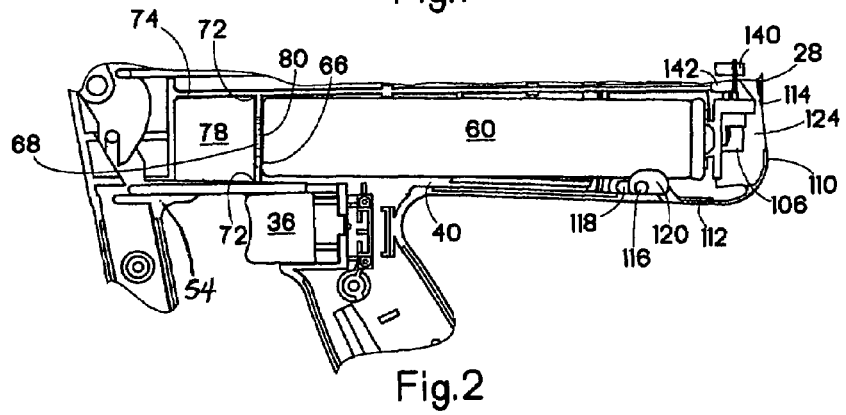
FIG. 2 is a fragmentary side elevation of the tool of FIG. 1 shown with the fuel cell in a second operational orientation.

Referring now to FIGS. 1 and 2, a combustion-powered, fastener-driving tool suitable for incorporating the present handle housing is generally designated 10. While the tool 10 is depicted as being of the type described in the patents listed above, other types of fastener-driving tools are contemplated as having the potential of incorporation of the present handle housing. The tool 10 includes a main housing 12, usually made of injection molded plastic. In the present tool 10, a variation of the housing construction is that a power source 14 (preferably a combustion-powered power source as is known in the art and shown hidden) is enclosed by a power source housing 16, and a separate handle housing generally designated 18 is joined to the power source housing and to the tool 10.

Other major components of the tool are the nosepiece assembly 20, which contacts the workpiece and through which fasteners (not shown) are driven, and a magazine 22 providing a supply of fasteners and configured for feeding the fasteners to the nosepiece assembly. In the preferred embodiment, the magazine is a coil-type, retaining a relatively large number of fasteners (at least 150) and the magazine advancement is powered by exhaust gases generated in the combustion process as described in U.S. Pat. No. 5,558,264, incorporated by reference. However, the present tool 10 is also contemplated as being used with straight, spring-advanced magazines having a reduced fastener capacity. The coil magazine 22 is configured for engagement with the nosepiece assembly 20 so that fasteners may be fed easily and with limited opportunity for becoming jammed in the delivery process. As such, a forward end 24 of the magazine 22 is slidingly engaged upon a receiving portion 26 of the nosepiece assembly 20.

The handle housing 18 is shown being secured along the power source housing 16 from a combustion end 28 to a nosepiece end 30 of the housing as well as the tool 10. As is well known in the art, the handle housing 18 is provided in two halves joined along a vertical parting line and secured together with fasteners at several fastener points 32. Included on the handle housing 18 is a primary handle 34 configured for accommodating a primary hand used to control the operation of the tool. The primary handle 34 incorporates a trigger switch 36 configured for initiating combustion and other tool functions as is well known in the art. A first end 38 of the primary handle 34, is closer to the power source 14, and is joined to a fuel cell chamber 40 which is directly connected to the tool 10 adjacent the power source housing 16. Depending on the application, the handle housing 18 may be directly fastened to the power source housing 16, or may be fastened to the tool 10 to tightly engage the power source housing. To facilitate this engagement with the power source housing 16, the fuel cell chamber 40 is preferably provided with conforming formations 42 which follow the outer contour of the power source housing at the point of contact.

A second end 44 of the primary handle 34 is connected to a battery housing 46 which is configured for retaining a battery as is known in the art. The battery is used to provide power to a control circuit which regulates many tool functions, including ignition, fan operation and fuel delivery. In the preferred handle housing 18, a secondary handle 48 is connected at one end 50 to the battery housing 46 and at a second end 52 to a support strut 54, the support strut being connected to a housing 56 enclosing and defining the fuel cell chamber 40. A magazine mounting point 58 is used to secure the magazine 22, which is also operationally engaged with the nosepiece assembly 20.

An important feature of the present fuel cell chamber 40 is that it is dimensioned for operationally receiving a fuel cell 60 in either one of a first orientation and a second orientation. The fuel cell 60 has a generally cylindrical body 62 and has a stem end 64 from which fuel is dispensed, as is known in the art, and a bottom end 66 opposite the stem end.

A shelf mount 68 is disposed in the fuel cell chamber 40 and is configured for engaging a fuel injector 70 when the fuel cell 60 is in the first orientation (FIG. 1), and for supporting the bottom end 66 of the fuel cell when the fuel cell is in the second orientation (FIG. 2). The shelf mount 68 is generally planar, joined at ends 72 to main opposed front and rear walls 74, 76 of the chamber 40 and preferably also to a side wall 78. It is preferred that the shelf mount 68 is integrally formed with the fuel cell chamber 40, however, other fastening technologies are contemplated, including but not limited to chemical adhesives, ultrasonic bonding and the like.

A generally semi-circular or "U"-shaped recess 80 is defined by the shelf mount 68 and is configured for accommodating the fuel injector 70. As is known in the art, the fuel injector 70 is powered by the battery and controlled by the control circuit to dispense a measured amount of fuel for a single combustion cycle upon a closing of the trigger switch 36. The fuel injector 70 is in fluid communication with a fuel line 82 which transports the fuel from the injector to a combustion chamber of the power source 14, also known in the art. In that the fuel injector 70 has a generally cylindrical body 84, the shelf mount 68 is dimensioned to receive the body, so that when mating halves of the handle housing 18 are joined, the fuel injector 70 is securely held in place (best seen in FIG. 2A).

Figure 2A:
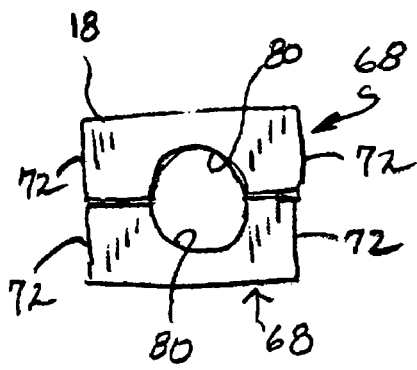
FIG. 2A is a fragmentary plan view of the shelf mount in the assembled housing.
Figure 3:
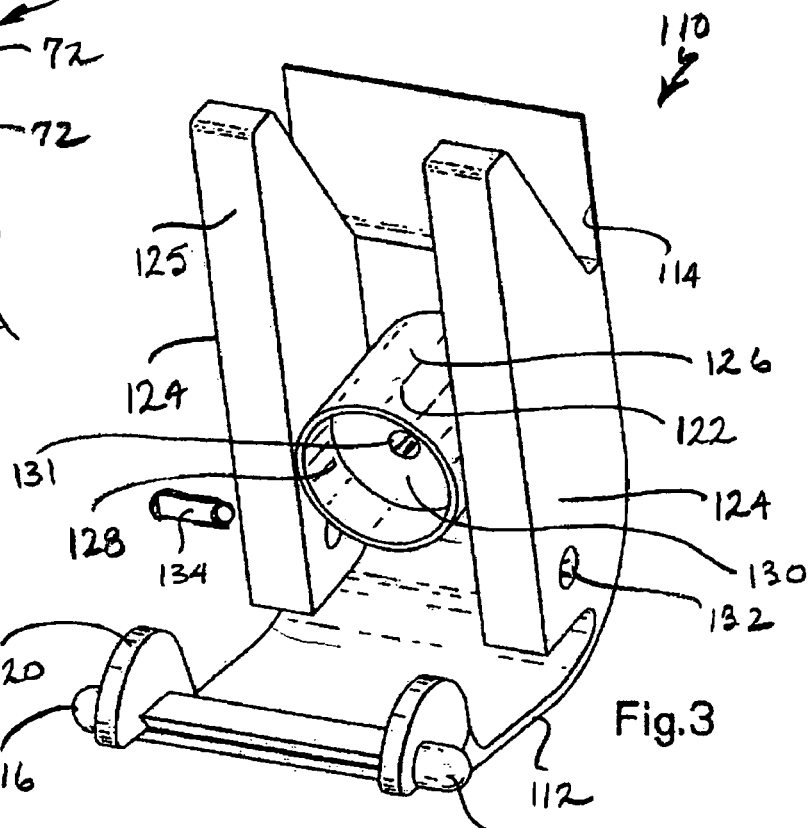
FIG. 3 is a perspective bottom view of a universal fuel cell door suitable for use in the present housing.

In the preferred embodiment the fuel injector 70 is held in place in the fuel cell chamber 40 by a pair of spaced, radially projecting annular ribs 86 which straddle the shelf mount 68. Corresponding halves of the handle housing 18 join to substantially surround the injector 70 (FIG. 2A). The shelf mount 68 defines a fuel injector chamber 88 between the mount and a lower wall 90 of the fuel cell chamber 40.

Figure 4:
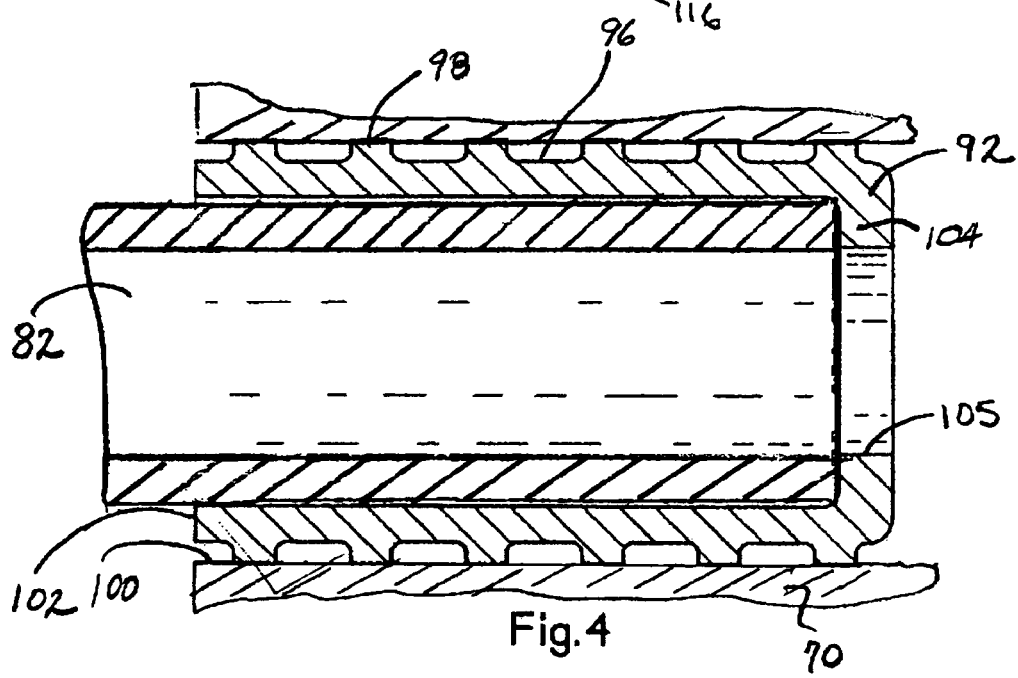
FIG. 4 is a vertical cross-section of a fuel line connector and associated components suitable for use in the present fuel cell chamber of the tool housing.

Referring now to FIGS. 1 and 4, a majority of the fuel injector body 84 is located within the fuel injector chamber 88. To facilitate connection of the fuel line 82 to the fuel injector 70, a push-on connector 92 is provided. It has been found that conventional fittings for such fuel lines which include threaded connections and 90° elbows have a tendency to restrict or reduce fuel flow. To address these concerns, the connector 92 is configured to allow a push-on attachment of an end 94 of the fuel line 82 to the connector, so that the line is sealingly connected to the fuel injector 70. An exterior surface 96 of the connector 92 is provided with a plurality of radially projecting spaced annular ribs 98 for secure and sealing engagement in an aperture 100 of an electronic fuel injector (EFI) valve of the fuel injector 70 which is part of the fuel passageway of the injector.

A first end 102 of the connector 92 is configured to slidingly yet sealingly receive the fuel line 82. A second end 104 of the connector 92 has a smaller aperture 105 than the first end 102, and is dimensioned to correspond to an inner diameter of the fuel line 82. Preferably, the aperture 105 is no smaller than the inner fuel line diameter. Thus, the second end 104 acts as a stop preventing further axial insertion of the fuel line 82 into the injector 70, while also facilitating fuel flow by not obstructing the fuel passageway. By using the connector 92, the fuel line 82 is securely and sealingly held in place with a reduced number of components. An identical connector 92 is employed at an opposite end of the fuel line 82 where it is inserted into the cylinder head (not shown).

Referring now to FIG. 2, a feature of the present handle housing 18 is that, in an alternative to the arrangement depicted in FIG. 1, the fuel cell 60 can be inserted into the chamber 40 so that the bottom end 66 rests upon, and is supported by the shelf mount 68. This orientation of the fuel cell 60 is employed when, instead of an electronic fuel injector 70, the tool 10 is provided with a mechanical fuel dispenser 106. Such a dispenser 106 dispenses a measured quantity of fuel as the nosepiece assembly 20 is actuated, and/or the trigger switch 36 is closed. A suitable dispenser 106 is disclosed in commonly-assigned U.S. Pat. No. 6,302,297 which is incorporated by reference herein.

With the fuel cell 60 oriented as depicted in FIG. 2, the fuel is dispensed near the combustion end 28 of the tool 10 and close to the combustion chamber (not shown). Thus, the fuel is dispensed in an opposite direction than when the injector 70 is provided as discussed in relation to FIG. 1. The shelf mount 68 is disposed relative to the fuel cell chamber 40 so that when the fuel cell bottom end 66 is resting upon the shelf mount, the dispenser 106 is in operational relationship to a fuel passage in fluid communication with the combustion chamber.

Referring now to FIGS. 1 and 4, access to the fuel cell chamber 40 is controlled by a fuel cell door 110, which is pivotably engageable on the handle housing 18 for selectively opening the fuel cell chamber. The door 110 is shaped like an inverted "L" when viewed from the side, and includes a body made up of a first leg 112 and a second leg 114 joined along a common edge to form the "L" shape, which is preferably integrally formed as through injection molding or similar techniques. Laterally outwardly projecting lugs 116 on the first leg 112 are pivotably engageable in noncircular apertures 118 on the handle housing (FIG. 2). The noncircular configuration of the apertures 118 provides for a sliding/pivoting action which allows the door 110 to totally clear the chamber 40 for easy insertion and retraction of the fuel cell 60. In the preferred embodiment, the lugs 116 are joined to cam formations 120 which guide and support the fuel cell 60.

A main function of the second leg 114 is closing off the fuel cell chamber 40 and preventing the entry of dirt and debris. Also on the second leg 114 of the door 110 are found separate formations for engaging the fuel cell in each of the first and second orientations depicted respectively in FIGS. 1 and 2. More specifically, these formations include a generally centrally located boss 122 for engaging the bottom end 66 of the fuel cell 60 in the first orientation where the injector 70 is employed, and a pair of spaced rails 124 for engaging the mechanical fuel dispenser 106. It is preferred that the boss 122 be removable from the leg 114 and have a generally cylindrical shape, with an outer wall 126 defining an interior chamber 128 in which a recessed floor 130 is provided. Since the boss 122 is removable from the door, the floor 130 is preferably provided with an attachment bore 131 configured for receiving a threaded fastener (not shown) for securing the boss to the leg 114.

The rails 124 project perpendicularly from the second leg 114 as does the boss 122, but the rails extend longitudinally generally parallel to the second leg. Preferably, the rails 124 extend approximately the full length of the second leg 114, however other lengths are contemplated depending on the application. As such, the rails 124 each define a planar slide track 125 which slides relative to the fuel dispenser 106 as the door 110 is closed. The preferably solid rail walls 124 are also helpful in guiding the dispenser 106 in position and supporting it during operation. In the configuration of FIG. 2 where fuel cell 60 is oriented so that the dispenser 106 is employed, it will be understood that the boss 122 is removed from the door 110 prior to assembly.

In keeping with the design objective of providing a handle housing 18 configured to accommodate a tool configuration wherein fuel is provided either by electronic fuel injection or mechanical fuel dispensing, when the fuel cell 60 is in the position for mechanical fuel delivery (FIG. 2), a fuel elbow fitting 140 provides fluid communication between the mechanical fuel dispenser 106 and the cylinder head 138. Accordingly, the handle housing 18, and specifically the fuel cell chamber 40 defines an elbow pocket 142 for accommodating the fuel fitting 140. The elbow pocket 142 is basically an opening in the front wall 74 large enough to accommodate the fuel elbow fitting 140. When the tool 10 is configured so that the fuel injector 70 is employed and the fuel cell 60 is oriented as in FIG. 1, it will be seen that the fuel elbow pocket 142 will not be used, since fuel is transported to the combustion chamber using the fuel line 82.

Thus, the present handle housing 18 features the fuel cell chamber 40 which is dimensioned for operationally accommodating the fuel cell 60 in either of two operational orientations. Regardless of whether the tool 10 is configured for use of the electronic fuel injector 70 or the mechanical fuel dispenser 106, the same housing 18 is employable. The shelf mount 68 is particularly useful in retaining the fuel injector when the fuel cell 60 is in a first operational orientation, and alternatively for providing a support base for the fuel cell when in a second operational orientation. In addition, the universal fuel cell door 110 is provided which is suitable for either tool orientation. As such, the manufacturer need not create special tooling and/or inventory of components for each type of tool configuration.

While particular embodiments of the present fuel cell compartment for a combustion-powered tool have been described herein, it will be appreciated by those skilled in the art that changes and modifications may be made thereto without departing from the invention in its broader aspects and as set forth in the following claims.

The invention claimed is:

1. A housing for a power tool having a power source, comprising:
    a fuel cell chamber configured for attachment to the power source, having a fuel cell door at one end and being dimensioned for operationally receiving a fuel cell in each of a first orientation and a second orientation; and
    a shelf mount disposed in said chamber and configured for axially securing a fuel injector in place when the fuel cell is in the first orientation, and for supporting a bottom of the fuel cell when the fuel cell is provided with a mechanical fuel dispenser in the second orientation, said shelf mount defining a distance between said fuel cell door that fully accommodates the fuel cell in said fuel cell chamber in said first orientation, and permits operational engagement between the mechanical fuel dispenser and said power source in said second orientation.

2. The housing of claim 1 wherein said shelf mount has a recess configured for accommodating the fuel injector.

3. The housing of claim 1, further including a fuel cell door pivotably engageable on said housing for selectively opening said fuel cell chamber, said door having separate formations for engaging the fuel cell in each of the first and second orientations.

4. The housing of claim 3 wherein said formations include a central boss for engaging the fuel cell in the first orientation, and a pair of spaced rails for engaging the fuel cell in the second orientation.

5. The housing of claim 4 wherein said rails are generally parallel to each other and said boss is located between said rails.

6. The housing of claim 4 wherein said boss is removably attached to said door.

7. The housing of claim 1 wherein the tool includes a fuel elbow fitting adjacent a combustion end of the power source, and said housing defines an elbow pocket for accommodating the fuel fitting.

8. The housing of claim 1 further including a primary handle having a first end directly connected to said fuel cell chamber and a second end connected to a battery housing, a secondary handle connected at one end to said battery housing and at a second end to a support strut, said support strut connected only at one end thereof to said fuel cell chamber housing.

9. A combustion-powered fastener driving tool, comprising:
   a power source located within a power source housing;
   a handle housing including a fuel cell chamber configured for attachment to said power source and dimensioned for receiving a fuel cell in each of a first orientation and a second orientation; and
   a primary handle having a first end connected to said fuel cell chamber and a second end connected to a battery housing, a secondary handle connected at one end to said battery housing and at a second end to a support strut, said support strut connected to said fuel cell chamber housing, said power source, said fuel cell chamber and said battery housing being generally parallel to each other, said handle and housing configuration enhancing user control when a lame capacity coil magazine is fitted to said tool.

10. The tool of claim 9 further including a fuel connector for fuel line in electronic fuel injection mode, said connector including an exterior surface configured for sealing engagement in a fuel injector, and an interior configured for slidingly and sealingly receiving a fuel line for effecting fluid communication of the fuel line and the fuel injector.

11. A universal fuel door for use in a combustion-powered tool having a power source and a housing defining a fuel cell chamber with an open end for receiving a fuel cell, said door comprising:
    a door body configured for pivotably engaging the open end of the fuel cell;
    at least one first formation for engaging the fuel cell upon insertion into the fuel cell chamber in a first orientation;
    at least one second formation for engaging the fuel cell upon insertion into the fuel cell chamber in a second orientation;
    said formations include a removable central boss depending from said door for engaging the fuel cell in the first orientation, and a pair of spaced rails for engaging the fuel cell in the second orientation, said rails are generally parallel to each other and said boss is located between said rails.

12. The fuel door of claim 11 wherein said rails define a track fur sliding engagement of a fuel dispenser.

* * * * *